Patented Oct. 9, 1928.

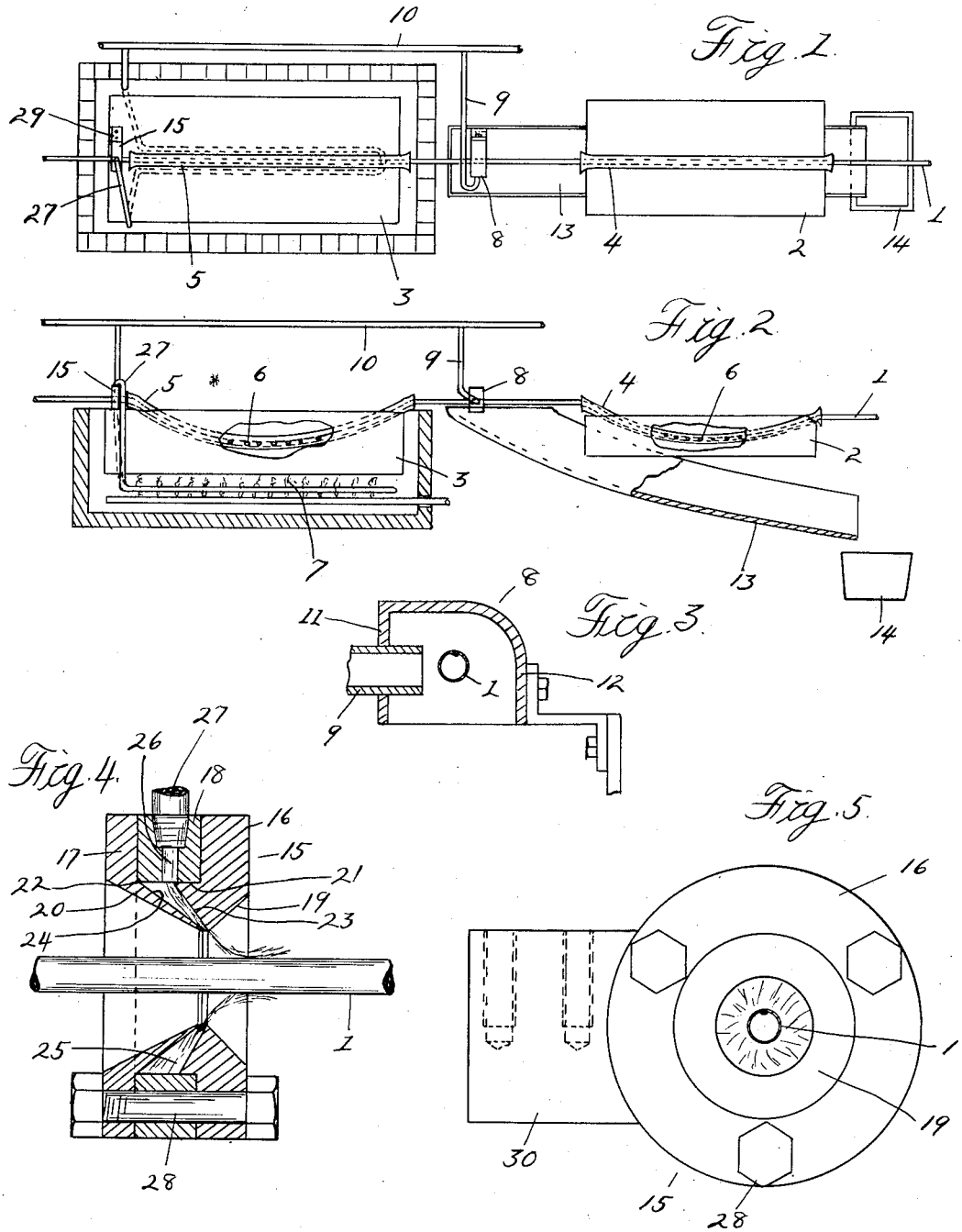

1,687,309

UNITED STATES PATENT OFFICE.

WILLIAM S. PRITCHARD, OF DETROIT, MICHIGAN, ASSIGNOR, BY MESNE ASSIGNMENTS, TO MOTOR PRODUCTS CORPORATION, A CORPORATION OF NEW YORK.

AIR DIE.

Application filed March 25, 1922. Serial No. 546,658.

The invention relates to devices for removing by air, surplus flux, solder or the like from tubing passing therethrough and is particularly applicable to machines for forming soldered lock seamed tubing. The invention has for its objects the novel features of construction and combinations and arrangements of parts as more fully hereinafter set forth.

In the drawings:

Figure 1 is a top plan view of a portion of the tube forming machine with the air dies embodying my invention, applied;

Figure 2 is a sectional side elevation thereof;

Figure 3 is a central cross section through the air die for removing surplus flux;

Figure 4 is a similar view of the air die for removing surplus solder;

Figure 5 is an end view thereof.

1 is a continuously moving lock seamed tubing which is successively immersed in a flux bath contained in the receptacle 2 and in a solder bath contained in the receptacle 3, this tubing being deflected into and out of the flux and solder baths by the tubular guides 4 and 5 respectively, the walls of which are apertured as at 6 to permit the flux and solder to come into contact with the tubing. The solder within the receptacle 3 is maintained in molten condition by suitable means such as the series of gas flames 7 located longitudinally centrally beneath the receptacle 3, the products of combustion being inclosed by the walls of a furnace or oven.

In order to remove surplus flux from the tubing after the latter has passed through the flux bath in the receptacle 2, I have provided the air die 8 into which the air pipe 9 leads, this air pipe being connected into a suitable compressed air supply pipe 10. As shown in Figure 3 particularly, the air die 8 is box shaped and has an open lower side. The air pipe 9 extends through the front fall 11 of this air die and is preferably of greater diameter than that of the tubing 1 which is in substantial axial alignment with the air pipe 9, but travels transversely thereof. The rear wall 12 of this air die is curved downwardly and outwardly for the purpose of directing a current of air around the rear side of the tubing and also for the purpose of deflecting the surplus flux removed by the air downwardly and into a suitable trough 13 which leads to a suitable receptacle 14 for receiving the removed flux.

To remove the surplus solder from the tubing 1 after the latter has passed through the solder bath in the receptacle 3, there is the annular air die 15 through which the tubing axially passes. The body of this air die comprises the front section 16, the rear section 17, and the intermediate section 18 for spacing the front and rear sections, which have axially aligned inwardly tapering openings 19 and 20 respectively. The intermediate section is a ring and positions the front and rear sections by engaging the annular shoulders 21 and 22 upon the front and rear sections respectively. The portion 23 of the rear wall of the front section connecting the shoulder 21 and the innermost periphery of the front section is preferably inclined forwardly, while the portion 24 of the front wall of the rear section connecting the shoulder 22 and the innermost periphery of the rear section is also included forwardly and at a smaller angle than the portion 23 to form with the intermediate ring the annular chamber 25 which tapers toward the axis of the air die and has a restricted annular outlet. This chamber is connected with the air supply pipe 10 by means of the radial passageway 26 in the intermediate section 18, which is connected to the air pipe 27.

The front, intermediate and rear sections 16, 17 and 18 respectively are secured to each other by suitable means such as the equi-distant bolts 28 extending therethrough and located beyond the annular air chamber 25.

With the arrangement as described, the compressed air entering the annular chamber 25 between the front and rear sections and the intermediate section is directed radially in all directions toward the tubing 1 and in a direction opposite to the direction of travel of the tubing, thereby removing surplus solder from the tubing and permitting it to drop directly into the receptacle 3 for the solder.

Since a certain amount of solder must remain upon the tubing and especially in its lock seam, the annular outlet of the annular chamber 25 is of less width above the tubing 1 than below the tubing so that in the event that the seam of the tubing is at the top, all of the solder will not be blown out of the seam. On the other hand, if the seam is located at the side or near the bottom of the tubing, sufficient solder will be left on the top of the tubing to gravitate around the same and into the seam.

The air passing through the air die 15 is heated and as shown in the present instance, this is accomplished by running the pipe 27 down around one side of the solder receptacle 3 and inwardly to a point adjacent the series of gas flames 7, from there along one side of the series of gas flames and returning along the other side and then outwardly and upwardly along the opposite side of the solder receptacle and to the compressed air supply pipe 10.

The air die 15 is supported upon the solder receptacle 3 by means of a bracket 29 secured to the solder receptacle and to the laterally extending lug 30 upon the intermediate section 18.

What I claim as my invention is:

1. In an air die, the combination with laterally adjacent sections having substantially aligned openings for the passage of a tube and adjacent walls spaced from each other to form an annular chamber for fluid under pressure communicating with the openings for directing the fluid under pressure against and around the periphery of the tube, said adjacent wall being inclined to the axes of the openings, of a ring between said sections for spacing the same and closing the outer portion of the annular chamber, and means for clamping said sections and ring in fixed relation to each other.

2. In an air die, the combination with laterally adjacent sections having substantially aligned openings for the passage of a tube, and adjacent walls spaced from each other to form an annular chamber for fluid under pressure and communicating with the openings and also inclined relative to the axis of the openings, of a ring between said sections for spacing the same, means upon said sections for locating said ring relative thereto, and means extending through said sections and ring for clamping the same in fixed relation to each other.

3. In an air die, the combination with laterally adjacent sections having substantially aligned openings for the passage of the work and having adjacent walls spaced from each other to form an annular chamber spaced from and surrounding the aligned openings, the opposite walls of said chamber being inclined downwardly forming an annular restricted passage communicating with the aligned openings aforesaid, and a ring disposed between the adjacent sections for closing the outer end of said chamber and having a passage therein communicating with the chamber for conducting air under pressure into the same.

4. In an air die, the combination with laterally spaced sections having substantially aligned openings for the passage of a tube, of a ring disposed between the said sections for holding the same in spaced relation, the adjacent walls of said sections extending inwardly from the said ring and adapted to cooperate with each other and with the inner surface of the ring to form a chamber for fluid under pressure, and means for securing the sections and ring together as a unit.

In testimony whereof I affix my signature.

WILLIAM S. PRITCHARD.